US010387371B2

(12) United States Patent
Ichikawa et al.

(10) Patent No.: US 10,387,371 B2
(45) Date of Patent: Aug. 20, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Ken Ichikawa, Kanagawa (JP); Kiyoshi Tashiro, Kanagawa (JP); Toshiharu Yokoyama, Kanagawa (JP); Yasuhiro Ito, Kanagawa (JP); Tomoyuki Shimizu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 411 days.

(21) Appl. No.: 15/131,626

(22) Filed: Apr. 18, 2016

(65) Prior Publication Data

US 2017/0091212 A1    Mar. 30, 2017

(30) Foreign Application Priority Data

Sep. 30, 2015 (JP) .................................. 2015-192731

(51) Int. Cl.
*G06F 16/16* (2019.01)
*G06F 16/176* (2019.01)

(52) U.S. Cl.
CPC .......... *G06F 16/162* (2019.01); *G06F 16/176* (2019.01)

(58) Field of Classification Search
CPC ........ G06F 2209/463; G06F 3/00; G06F 9/46; G06F 9/465; G06F 9/541
See application file for complete search history.

(56) References Cited

U.S. PATENT DOCUMENTS 6,609,114 B1 * 8/2003 Gressel ................ G06Q 20/105
705/50
2004/0036635 A1 * 2/2004 Kimura ................... H03M 7/40
341/107

(Continued)

FOREIGN PATENT DOCUMENTS

JP    2008-129803 A    6/2008
JP    2009-207061 A    9/2009
JP    2011-170715 A    9/2011

OTHER PUBLICATIONS

May 30, 2019 Office Action issued in Japanese Patent Application No. 2015-192731.

*Primary Examiner* — Angelica Ruiz
(74) *Attorney, Agent, or Firm* — Oliff PLC (57) ABSTRACT

An information processing apparatus includes first and second staring units, a receiving unit, and a remove unit, a specifying unit. The first storing unit stores shared data which is to be shared and used by plural persons, and specific information for specifying the shared data. The receiving unit receives a removal instruction to remove the shared data. The remove unit removes from the first storing unit the shared data corresponding to the removal instruction received by the receiving unit. The specifying unit specifies a transmitter of operation history information which is received by the receiving unit, by using the specific information. If after the shared data is removed by the remove unit, the received operation history information for the removed shared data is specified by the specifying unit, the second storing unit stores the operation history information as operation history information for the removed shared data.

13 Claims, 12 Drawing Sheets

(56) References Cited

U.S. PATENT DOCUMENTS

| | | | | |
|---|---|---|---|---|
| 2007/0206754 | A1* | 9/2007 | Ueda | H04N 1/32074 |
| | | | | 379/201.01 |
| 2008/0222734 | A1* | 9/2008 | Redlich | G06F 21/577 |
| | | | | 726/26 |
| 2009/0132613 | A1* | 5/2009 | Lakshmipathy | G06F 16/68 |
| 2010/0235748 | A1* | 9/2010 | Johnson | G06Q 30/00 |
| | | | | 715/730 |
| 2011/0021145 | A1* | 1/2011 | Johnson | H04W 4/02 |
| | | | | 455/41.2 |
| 2013/0226318 | A1* | 8/2013 | Procyk | G05B 13/021 |
| | | | | 700/33 |
| 2015/0287432 | A1* | 10/2015 | Nakano | G06F 21/10 |
| | | | | 386/259 |

\* cited by examiner

| SHARED DOCUMENT DATA LIST | | | | |
|---|---|---|---|---|
| DOCUMENT NAME | CREATOR | CREATED DATE AND TIME | SIZE | OPERATION HISTORY |
| PHOTO (TRAVEL).jpg | USER C | 2015/07/21 08:55 | 621.5KB | ▶ |
| ENVELOPE.txt | USER A | 2015/03/22 11:39 | 521.3KB | ▶ 80 |
| YACHT DESIGN VIEW.pdf | USER B | 2015/05/13 13:45 | 265.3KB | ▶ |

CLOSE

DISPLAY SCREEN EXAMPLE OF OPERATION HISTORY INFORMATION
(IN CASE WHERE DOCUMENT DATA IS REMOVED)

OPERATION HISTORY LIST

| OPERATION DATE AND TIME | OPERATOR | CLIENT ADDRESS | OPERATION CLIENT | OPERATION CONTENTS | OPERATION TARGET DOCUMENT NAME |
|---|---|---|---|---|---|
| 2015/08/24 19:19 | USER A | 121.27.195.186 | TERMINAL APPARATUS 20A | BROWSING | ENVELOPE.txt |
| 2015/08/25 14:22 | USER C | 121.27.195.188 | TERMINAL APPARATUS 20C | BROWSING | PHOTO(TRAVEL).jpg |
| 2015/08/25 14:30 | USER C | 121.27.195.188 | TERMINAL APPARATUS 20C | PRINTING | PHOTO(TRAVEL).jpg |
| 2015/08/26 09:23 | USER A | 121.27.195.186 | TERMINAL APPARATUS 20A | BROWSING | YACHT DESIGN VIEW.pdf |
| 2015/08/26 10:12 | USER A | 121.27.195.186 | TERMINAL APPARATUS 20A | BROWSING | YACHT DESIGN VIEW.pdf |
| 2015/08/26 17:29 | USER B | 121.27.195.187 | TERMINAL APPARATUS 20B | BROWSING | ENVELOPE.txt |
| 2015/08/26 18:48 | USER B | 121.27.195.187 | TERMINAL APPARATUS 20B | PRINTING | ENVELOPE.txt |

CLOSE

FIG. 11

DOCUMENT DATA EXAMPLE IN RECYCLE BIN FOLDER

| RECYCLE BIN | | | | — ▫ ✕ |
|---|---|---|---|---|
| ✕ REMOVE FROM RECYCLE BIN | RESTORE FROM RECYCLE BIN | | EMPTY RECYCLE BIN | |
| DOCUMENT NAME | ORIGINAL REGISTRATION LOCATION | CREATOR | REMOVE DATA AND TIME | |
| ENVELOPE.txt | SHARED FOLDER 5 | USER A | 2015/09/01 20:33 | |
| PHOTO (TRAVEL).jpg | SHARED FOLDER 12 | USER C | 2015/09/04 08:39 | |
| CONFERENCE NOTIFICATION.pdf | TEST FOLDER | USER C | 2015/09/05 14:55 | |
| YACHT DESIGN VIEW.pdf | SHARED FOLDER 5 | USER B | 2015/09/10 16:18 | |
| | | | CLOSE | |

FIG. 12

DISPLAY SCREEN EXAMPLE OF OPERATION HISTORY INFORMATION
IN CASE WHERE REMOVED DOCUMENT DATA IS RESTORED

OPERATION HISTORY LIST – PHOTO(TRAVEL).jpg

| OPERATION DATE AND TIME | OPERATOR | CLIENT ADDRESS | OPERATION CLIENT | OPERATION CONTENTS |
|---|---|---|---|---|
| 2015/08/25 14:22 | USER C | 121.27.195.188 | TERMINAL APPARATUS 20C | BROWSING |
| 2015/08/25 14:30 | USER C | 121.27.195.188 | TERMINAL APPARATUS 20C | PRINTING |

CLOSE

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-192731 filed Sep. 30, 2015.

BACKGROUND

Technical Field

The present invention relates to an information processing apparatus, an information processing method, and a non-transitory computer readable medium.

SUMMARY

According to an aspect of the invention, an information processing apparatus includes a first storing unit, a receiving unit, a remove unit, a specifying unit, and a second storing unit. The first storing unit stores shared data which is to be shared and used by plural persons, and specific information for specifying the shared data. The receiving unit receives a removal instruction to remove the shared data. The remove unit removes from the first storing unit the shared data corresponding to the removal instruction received by the receiving unit. The specifying unit specifies a transmitter of operation history information which is received by the receiving unit, by using the specific information. In a case where after the shared data is removed by the remove unit, the operation history information, received by the receiving unit, for the removed shared data is specified by the specifying unit, the second storing unit stores the operation history information as operation history information for the removed shared data.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the drawings.

Figure 1:
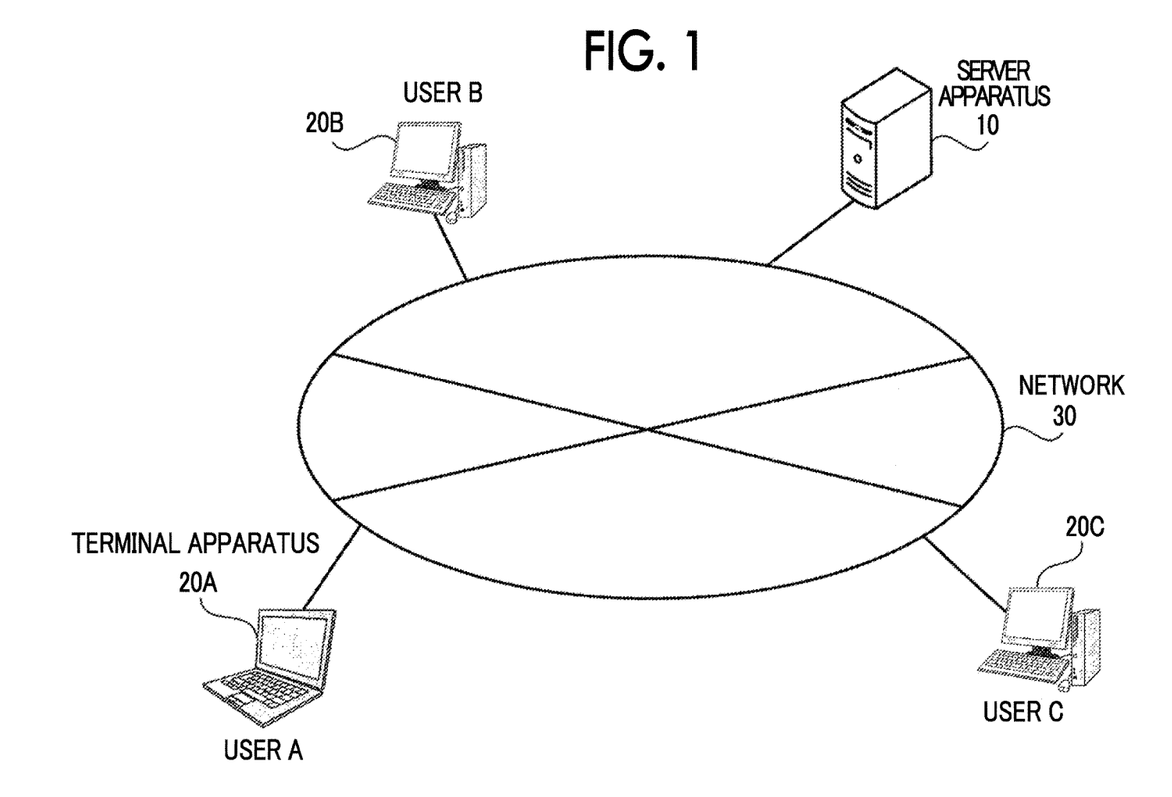
FIG. 1 is a diagram illustrating a system configuration of an information processing system according to an exemplary embodiment of the present invention.

FIG. 1 is a diagram illustrating a system configuration of an information processing system according to an exemplary embodiment of the present invention.

The image processing system according to the exemplary embodiment of the present invention includes a server apparatus (information processing apparatus) 10 and plural terminal apparatuses 20A to 20C which are client apparatuses, as illustrated in FIG. 1. The server apparatus 10 and the terminal apparatuses 20A to 20C are connected through a network 30 to each other. The terminal apparatuses 20A to 20C are respectively used by users A to C. In addition, in the present exemplary embodiment, description will be given on a case where three terminal apparatuses 20A to 20C are connected to the server apparatus 10 through a network 30, for the purpose of simplifying the description. It should be noted that the number of terminal apparatuses is not limited to three.

The server apparatus 10 stores document data or the like to be shared and used by plural persons as shared data (master data). The terminal apparatuses 20A to 20C are configured to copy the shared data stored in the server apparatus 10 and download the copied shared data as copy data, so that the terminal apparatuses 20A to 20C can use the downloaded copy data to browse and print the downloaded copy data.

In a case where an operation of browsing or printing the copy data is performed in the terminal apparatuses 20A to 20C, information such as operation date and time, operation contents, an operator, a client address, and an operation client is transmitted to the server apparatus 10 through the network 30 as operation history information.

The server apparatus 10 records and manages the contents of the operation that has been performed on this shared data, by managing the operation history information transmitted from the terminal apparatuses 20A to 20C together with the shared data.

With the above process, even in a case where the contents of the shared data are leaked, or printed matters having the shared data printed on are found, it is possible to track a route through which the contents of the shared data has been leaked, by viewing the recorded operation history information.

In order to manage such operation history information, if an operation for copy data is performed in the terminal apparatuses 20A to 20C, it is necessary to immediately transmit the operation contents as the operation history information to the server apparatus 10 in real time. In addition, in a case where the terminal apparatuses 20A to 20C are disconnected from the network 30 and no longer able to communicate with the server apparatus 10, it is necessary to make the operation for the copy data that has been downloaded to the terminal apparatuses 20A to 20C impossible entirely.

Such a configuration enables the server apparatus 10 to always know the contents of the operation that has been performed on the copy data in the terminal apparatuses 20A to 20C.

However, if a user attempts to operate such a process too strictly, the convenience of the system is deteriorated. Therefore, the information processing system of this exemplary embodiment is configured such that if a time less than 24 hours has lapsed from a state (offline state) in which the terminal apparatuses 20A to 20C are disconnected from the network 30 and are not able to communicate with the server apparatus 10, the operation (such as browsing or printing) for the copy data is possible, and if the offline state excesses 24 hours, the operation (such as browsing or printing) for the copy data is not possible.

Figure 2:
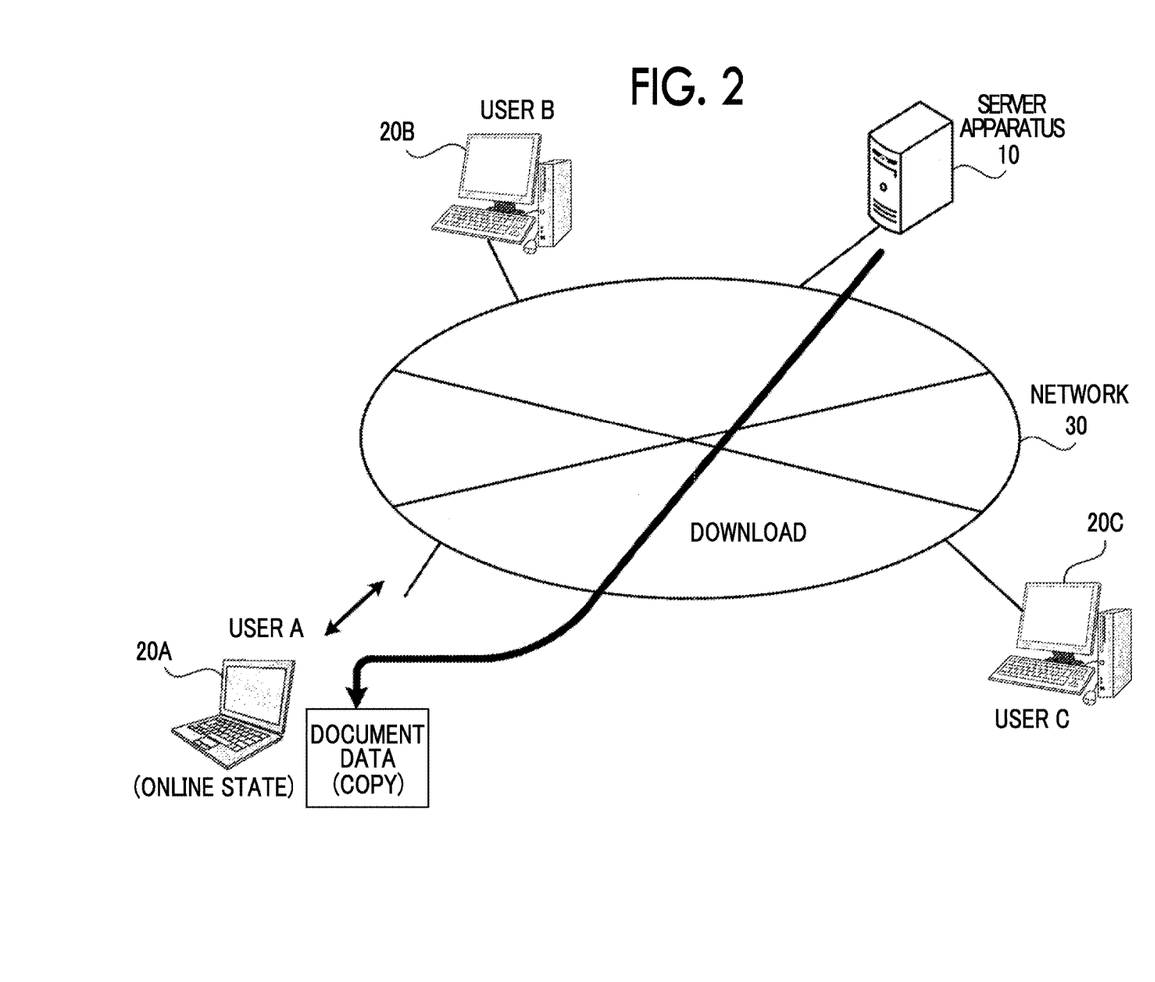
FIG. 2 is a diagram illustrating a state where a terminal apparatus 20A is disconnected from a network 30 in the information processing system illustrated in FIG. 1.

For example, as illustrated in FIG. 2, it is assumed that copy data of a certain type of document data is downloaded and stored in the a terminal apparatus 20A which is a notebook personal computer (hereinafter, abbreviated as a notebook PC), and thereafter the terminal apparatus 20A is disconnected from the network 30. Even in such a case, a user A is able to operate the copied document data by printing or browsing the copied document data within 24 hours, in the terminal apparatus 20A.

However, the contents of the operation that has been performed on the copy data in such an offline state are accumulated in the terminal apparatus 20A as operation history information, and if the terminal apparatus 20A is connected to the network 30, the contents of the operation are transmitted to the server apparatus 10.

Therefore, although the server apparatus 10 is not able to know the contents of the operation on the copy data in real time, if the terminal apparatus 20A is connected to the network 30, the server apparatus 10 receives the operation history information that has been performed on the copy data within 24 hours from the start of the offline state.

Figure 3:
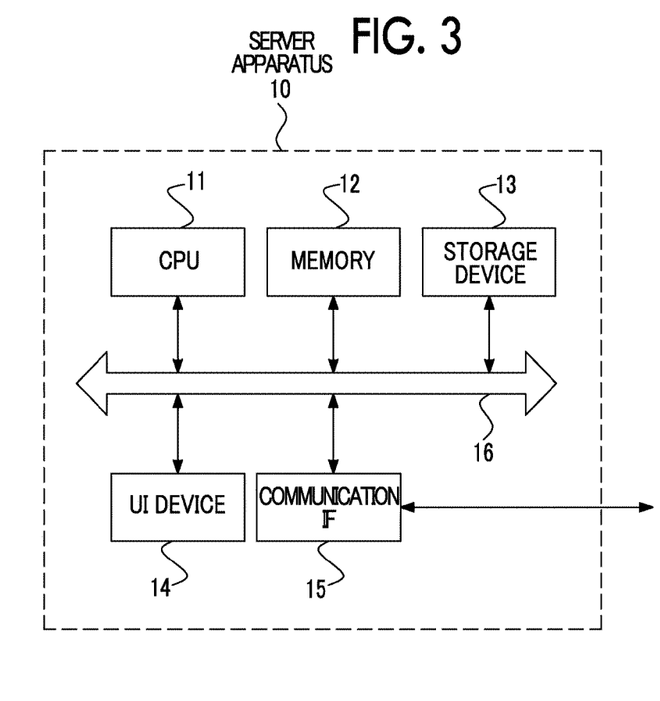
FIG. 3 is a block diagram illustrating a hardware configuration of a server apparatus 10 in the exemplary embodiment of the present invention.

The hardware configuration Of the server apparatus 10 in the information processing system of the present, exemplary embodiment is illustrated in FIG. 3.

As illustrated in FIG. 3, the server apparatus 10 includes a CPU 11, a memory 12, a storage device 13 such as a hard disk drive (HDD), a user interface (UI) device 14 such as a touch panel or a liquid crystal display, and a keyboard, a communication interface (IF) 15 that transmits and receives data to and from the terminal apparatuses 20A to 20C through the network 30, and the like. These components are connected to each other through a control bus 16.

The CPU 11 controls the operation of the server apparatus 10 by executing a predetermined process based on a control program stored in the memory 12 or the storage device 13. In this exemplary embodiment, the CPU 11 reads and executes the control program stored in the memory 12 or the storage device 13. Alternatively, the program may be stored in a storage medium such as a CD-ROM, and say be provided to the CPU 11.

Figure 4:
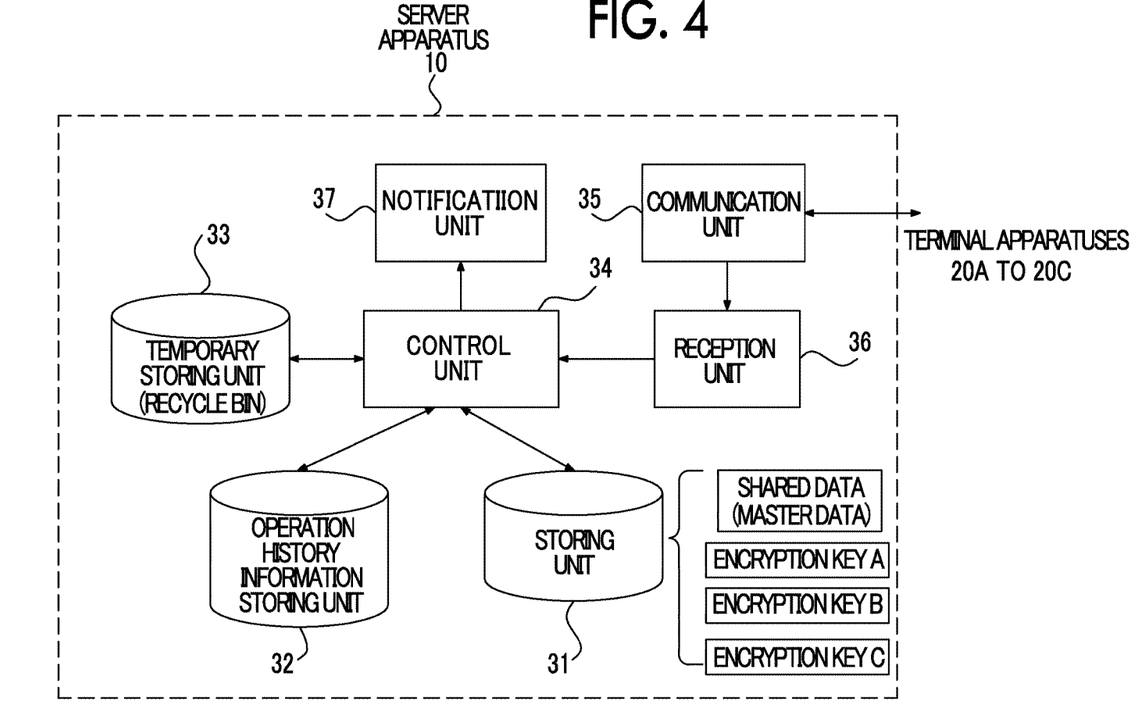
FIG. 4 is a block diagram illustrating a function configuration of the server apparatus 10 in the exemplary embodiment of the present invention.

FIG. 4 is a block diagram illustrating the function configuration of the server apparatus 10 which is implemented by the execution of the above control program.

As illustrated in FIG. 4, the server apparatus 10 of the present exemplary embodiment includes a storing unit 31, an operation history information storing unit 32, a temporary storing unit (recycle bin) 33, a control unit 34, a communication unit 35, a reception unit 36, and a notification unit 37.

The storing unit 31 stores shared data to be shared and used by plural users, and specific information for specifying the shared data. In addition, the storing unit 31 stores the specific information and the shared data in association with each specific information or each shared data.

Here, the specific information in the present exemplary embodiment is, specifically, encryption key information that is set for encryption of the shared data. In the present exemplary embodiment, a common key encryption system is used as an encryption system. The server apparatus 10 and the terminal apparatus 20A of the user A store encryption keys A, respectively. Information is encrypted with the encryption key A and transmitted and received between the server apparatus 10 and the terminal apparatus 20A.

Similarly, information transmitted and received between the server apparatus 10 and the terminal apparatus 20B are encrypted with an encryption key B, and information transmitted and received between the server apparatus 10 and the terminal apparatus 20C are encrypted with an encryption key C. In other words, the server apparatus 10 stores the encryption keys A to C in order to transmit and receive data to and from the users A to C. The encryption key may set for each terminal apparatus, and plural documents may be encrypted with a single encryption key. Alternatively, an encryption key may be set for each document, and each single document may be encrypted with a corresponding single encryption key.

The operation history information storing unit 32 stores the operation history information indicating the contents of the operations for the copy data, which are performed in the terminal apparatuses 20A to 20C.

In a case where after the shared data stored in the storing unit 31 is removed by the control unit 34, the operation history information for the removed shared data is received by the reception unit 36, if the operation history information is specified by using the encryption key information, the operation history information storing unit 32 stores the operation history information as valid. The expression "the operation history information is valid" means that there is no falsity in the operation history information, and includes an example in which a transmission source of the operation history information sad an operation terminal match. On the other hand, the expression that "the operation history information is fraudulent" means that there is a falsity in the operation history information, and includes an example in which a transmission source of the operation history information and an operation terminal do not match.

In other words, in a case where the operation history information is not specified by using the encryption key information, the operation history information is regarded as fraudulent, and is not stored in the operation history information storing unit 32.

The temporary storing unit (recycle bin) 33 temporarily stores the shared data to which a removal instruction is given.

Upon receipt of the removal instruction to remove the shared data stored in the storing unit 31, the control unit 34 removes the shared data corresponding to the received removal instruction from the storing unit 31.

The control unit 34 specifies the operation history information received by the reception unit 36, by using the encryption key information.

Specifically, the control unit 34 sequentially decodes the operation history information that is transmitted from the terminal apparatuses 20A to 20C and is received by the reception unit 36, with the encryption keys A to C, and specifies a terminal apparatus corresponding to an encryption key that is used when the decoding is successful, as a transmission source of the operation history information.

For example, in a case where the operation history information received by the reception unit 36 can be decoded with the encryption key B, the control unit 34 determines that the transmission source of the operation history information is the terminal apparatuses 20B.

Figure 5:
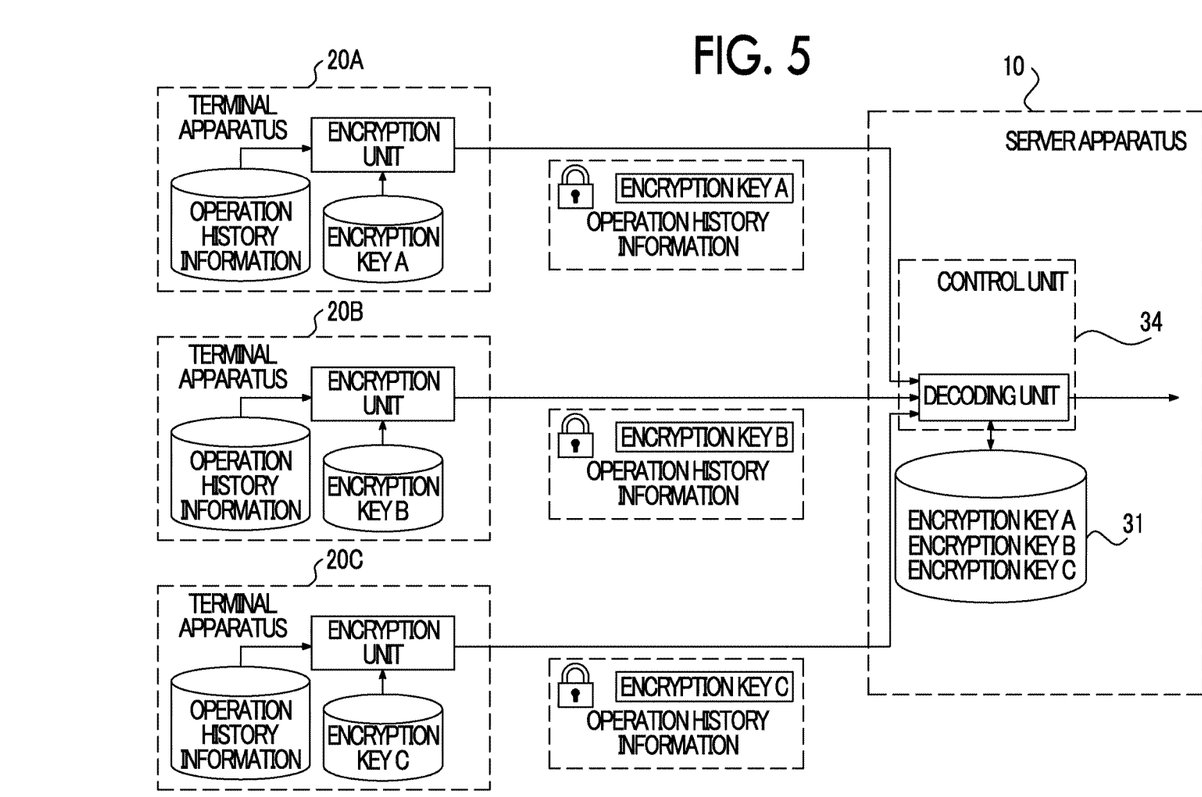
FIG. 5 is a diagram illustrating a process of specifying a transmitter of operation history information, by using encryption key information.

A process of specifying a transmitter of the operation history information, by using the encryption key information will be described with reference to FIG. 5.

The terminal apparatuses 20A to 20C respectively store the encryption keys A to C. The terminal apparatuses 20A to 20C encrypt the operation history information that are to be transmitted to the server apparatus 10, with the encryption keys A to C which are respectively stored, and transmits the encrypted operation history information to the server apparatus 10.

Even in the server apparatus 10, the encryption keys A to C are stored in the storing unit 31. A decoding unit in the control unit 34 sequentially decodes the received operation history information with the encryption keys A to C. Then, the control unit 34 specifies the operation history information based on which one of the encryption keys A to C the operation history information is decoded with.

In a case where after the shared data stored in the storing unit 31 is removed, operation history information for removed shared data is specified, the operation history information storing unit 32 stores the operation history information as the operation history information for the removed shared data. In a case where it is instructed to restore the shared data stored in the temporary storing unit 33 which is a so-called recycle bin, the control unit 34 restores the designated shared data in the storing unit 31.

Furthermore, the control unit 34 manages the operation history information for the shared data which is stored in the storing unit 31 together with the shared data.

In a case where the shared data is restored, the control unit 34 acquires from the operation history information storing unit 32 the operation history information from a time at which the shared data is moved to the temporary storing unit 33 to a time at which the shared data is restored, and manages the acquired operation history information together with the shared data.

The communication unit 35 communicates with the terminal apparatuses 20A to 20C at certain time intervals. Therefore, it is possible to determine whether the terminal apparatuses 20A to 20C are in an online state of currently being connected to the network 30 or an offline state of not being connected to the network 30, based on whether or not communication is performed between the terminal apparatuses 20A to 20C and the server apparatus 10.

The reception unit 36 receives the operation history information transmitted from the terminal apparatuses 20A to 20C, through the communication unit 35.

In a case where the operation history information is not specified by the control unit 34, the notification unit 37 notifies a preset administrator that the operation history information is fraudulent.

Further, in a case where the shared data stored in the storing unit 31 is copied, the copied shared data is transferred to one ox the terminal apparatuses 20A to 20C, and an operation time in operation history information transmitted from the one terminal apparatus to which the copy data is transferred is a time by which a predetermined period, that is, 24 hours has elapsed since the communication unit 35 is not communicable with the terminal apparatus, the notification unit 37 notifies the administrator that there is a fraudulent operation for the copied shared data, outside the predetermined period. In a case where an operator performs an unauthorized operation, an unauthorized person performs an operation, an operation is performed before authorization is granted, or an operation is performed in an unauthorized location, it is determined that there is a fraudulent operation, and the administrator may be notified that there is a fraudulent operation. With respect to whether or not there is a fraudulent operation, operation contents that are authorized may be stored in advance, and in a case where an operation that has not been registered is performed, it may be determined that there is a fraudulent operation. Alternatively, operation contents that are unauthorized may be registered in advance, and in a case where a registered operation is performed, it may be determined that there is a fraudulent operation.

Next, the operation of the information processing system of this exemplary embodiment will be described in detail with reference to the drawings.

Figure 6:
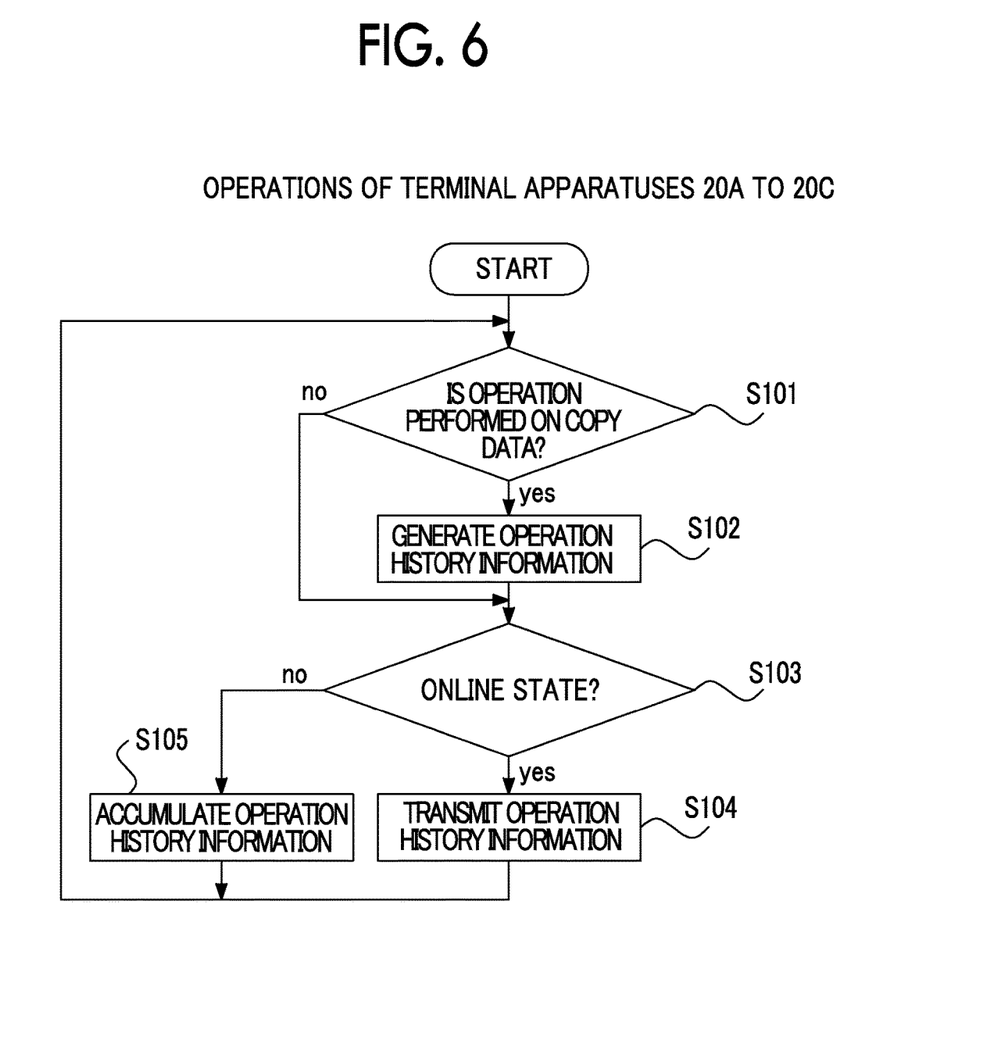
FIG. 6 is a flowchart illustrating operations of terminal apparatuses 20A to 20C in the exemplary embodiment of the present invention.

At first, the operations of the terminal apparatuses 20A to 20C will be described with reference to the flowchart of FIG. 6.

If an operation such as printing or browsing is performed on the copy data downloaded from the server apparatus 10 (Yes in step S101), the terminal apparatuses 20A to 20C generate operation history information indicating the performed operation contents (step S102).

Then, the terminal apparatuses 20A to 20C determine whether or not the terminal apparatuses 20A to 20C are in the online state of being connected to the network 30, by detecting whether or not the terminal apparatuses 20A to 20C are communicable with the server apparatus 10 (step S103).

In a case where the terminal apparatuses 20A to 20C are in the online state of being connected to the network 30 (Yes in step S103), the terminal apparatuses 20A to 20C transmit the generated operation history information to the server apparatus 10 (step S104).

In a case where the terminal apparatuses 20A to 20C are not in the online state of being connected to the network 30, that is, in the offline state (No in step S103), the terminal apparatuses 20A to 20C accumulate the generated operation history information therein (step S105).

Then, the operation history information, which is accumulated in step S105, is accumulated until the terminal apparatuses 20A to 20C enter the online state. If the terminal apparatuses 20A to 20C enter the online state, the operation history information is transmitted to the server apparatus 10 (steps S103 and S104).

Figure 7:
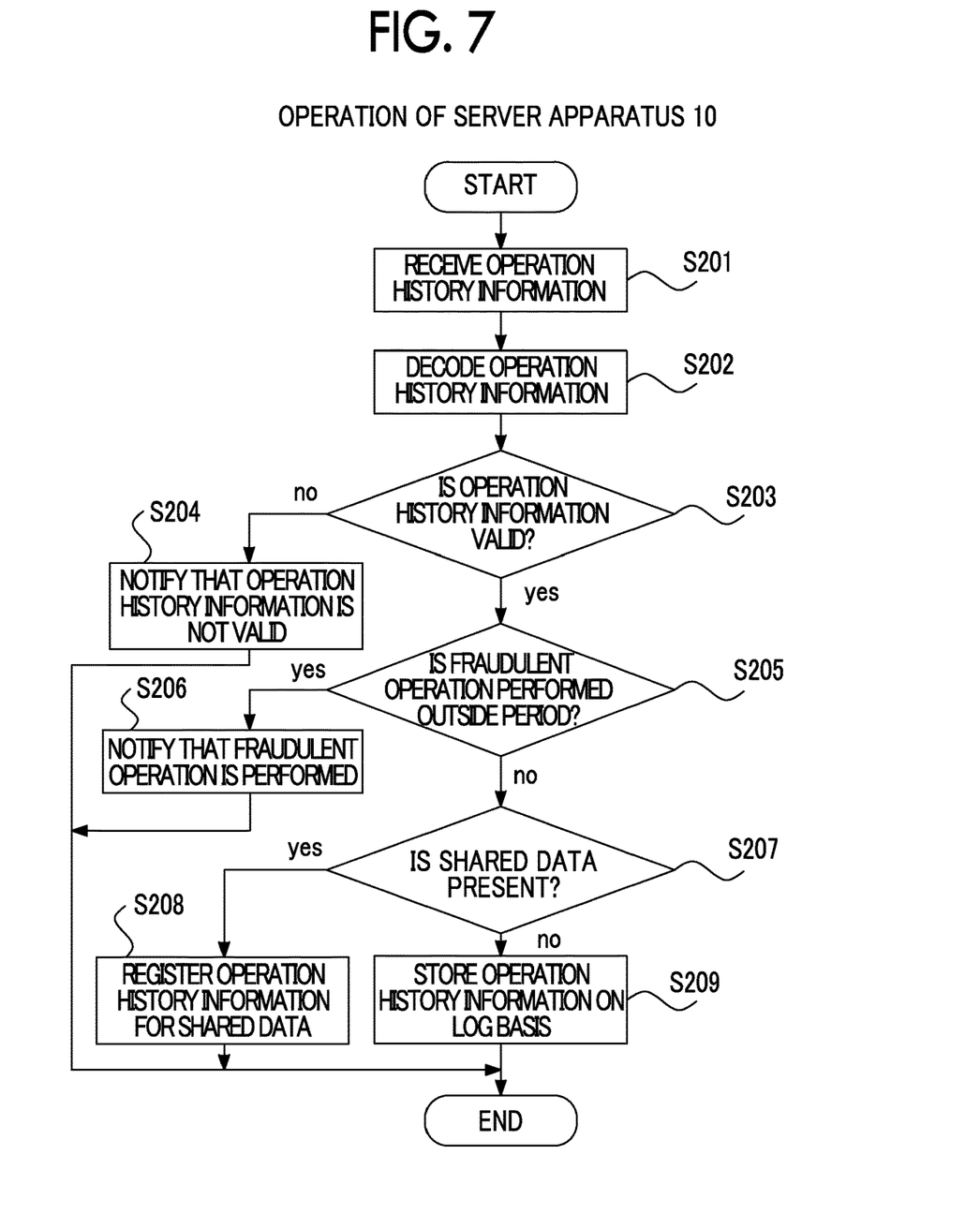
FIG. 7 is a flowchart illustrating an operation of the server apparatus 10 in the exemplary embodiment of the present invention.

Next, the operation of the server apparatus 10 will be described with reference to a flowchart of FIG. 7.

In the server apparatus 10, if the reception unit 36 receives the operation history information transmitted from the terminal apparatuses 20A to 20C (step S201), the control unit 34 sequentially decodes the received operation history information with the encryption keys A to C stored in the storing unit 31 (step S202).

The control unit 34 specifies the operation history information based on which one of the encryption keys A to C the operation history information is decoded with, and determines whether or not the operation history information is valid (step S203).

Specifically, in a case where the operation history information can be specified by using the encryption key information, the control unit 34 determines that the operation history information is valid. In a case where the operation history information cannot be specified, the control unit 34 determines that the operation history information is fraudulent.

In a case where the operation history information received in step S203 is determined to be fraudulent (No in step S203), the notification unit 37 notifies a preset destination such as an administrator that the operation history information is not valid (step S204).

In a case where the operation history information received in step S203 is determined to be valid (Yes in step S203), the control unit 34 determines whether or not a fraudulent operation is performed, based on the contents of the operation history information (step S205).

Specifically, in a case where the operation time in the operation history information transmitted from the terminal apparatuses is a time by which 24 hours have elapsed since the communication unit 35 is not communicable with the terminal apparatus, the control unit 34 determines that there is a fraudulent operation on the copy data of the shared data outside the predetermined period. In a case where an operation which is unauthorized by the operator is performed, an unauthorized person performs an operation, an operation is performed before authorization is granted, or an operation is performed in an unauthorized location, it may be determined that there is a fraudulent operation.

In other words, in a case where any of an operation time, an operator, operation contents, and an operation location in the contents of the operation history information is fraudulent, the notification unit 37 may notify that there is a fraudulent operation on the shared data.

In a case where the control unit 34 determines that there is a fraudulent operation on the copy data in step S205 (Yes in step S205), the notification unit 37 notifies the administrator that a fraudulent operation is performed (step S206).

Furthermore, in a case where the control unit 34 determines that there is no fraudulent operation on the copy data outside the predetermined period in step S205 (No in step S205), the control unit 34 determines whether or not shared data corresponding to the received operation history information is present in the storing unit 31 (step S207).

Then, in a case where the shared data corresponding to the received operation history information is present (Yes in step S207), the control unit 34 stores the operation history information in the operation history information storing unit 32, and registers the operation history information in association with the shared data in the storing unit 31 for management (step S208).

In a case where the shared data corresponding to the received operation history information is not present (No in step S207) the control unit 34 stores the operation history information in the operation history information storing unit 32 on a log basis (step S209).

In other words, in such a case, the shared data corresponding to the received operation history information is removed and is not present. Therefore, it is not possible to associate the operation history information with the shared data, and the operation history information is stored for each operation as log information.

Next, the operation of the information processing system of the present exemplary embodiment will be described with reference to a specific display screen example.

Figure 8:
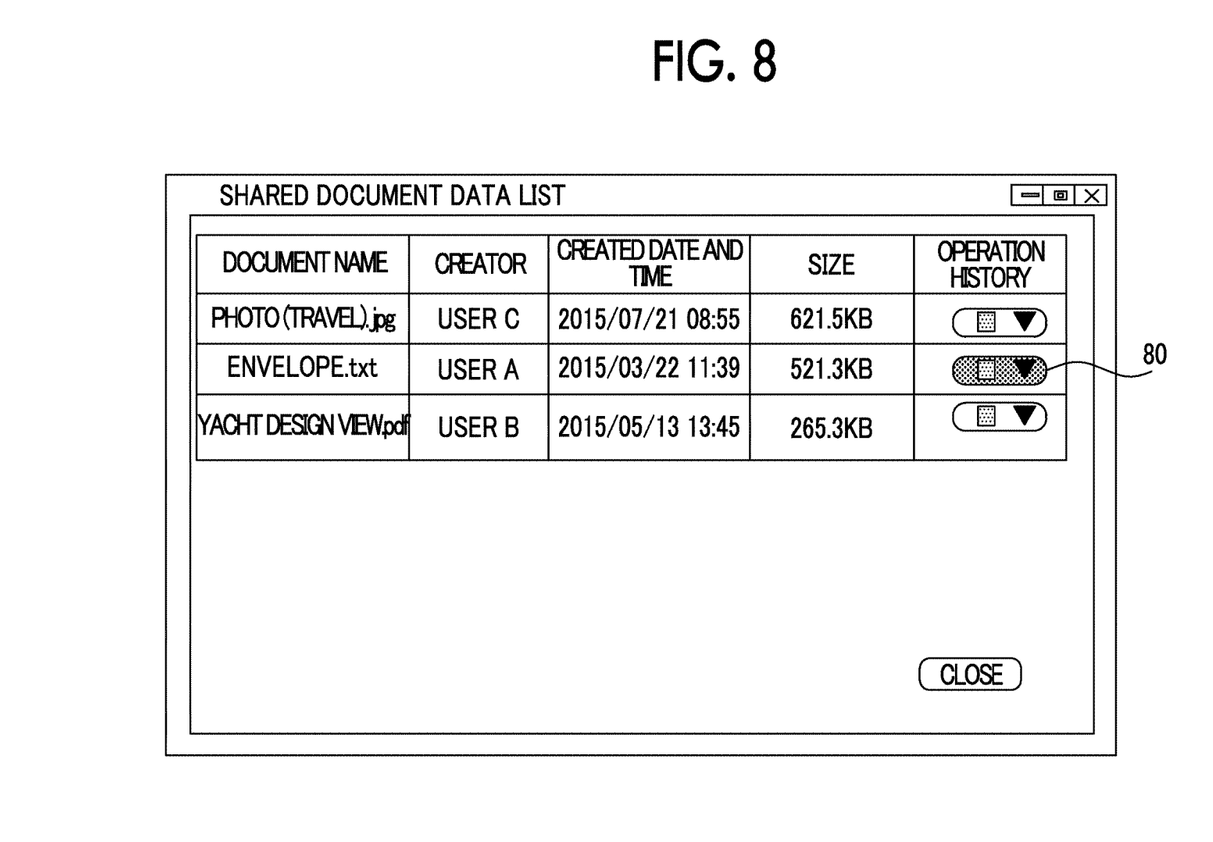
FIG. 8 is a diagram illustrating a screen example in a case where a list of shared data is displayed.
Figure 9:
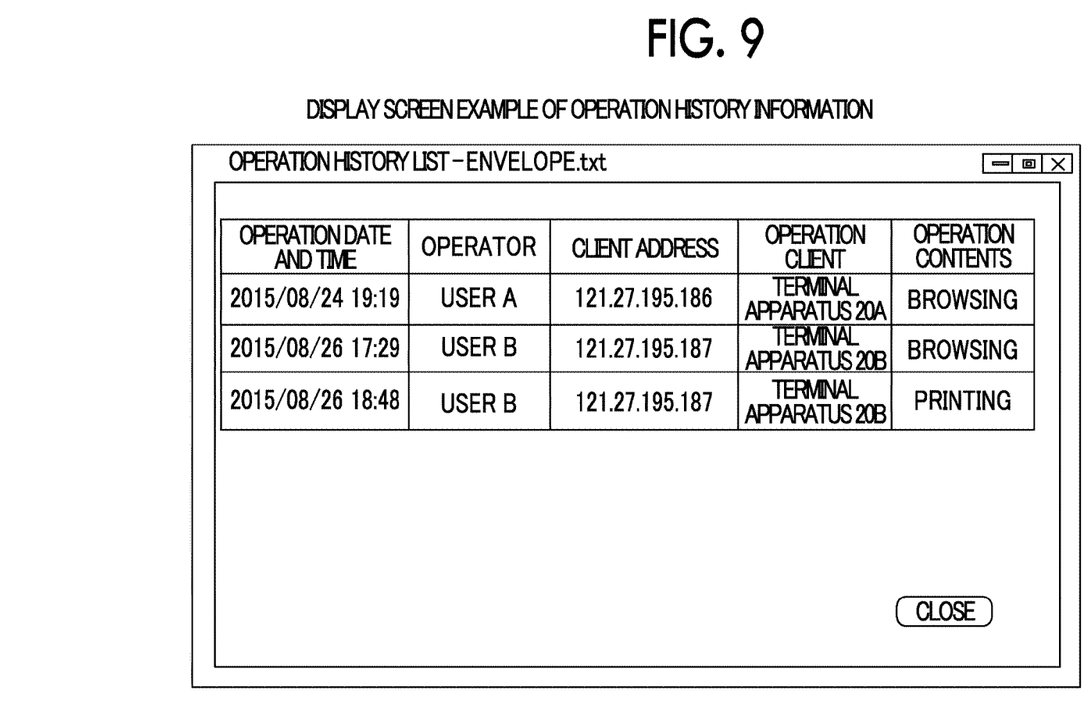
FIG. 9 is a diagram illustrating a screen example in a case of checking a list of operation history information for shared data that are not removed.

At first, FIGS. 8 and 9 illustrate management screen examples for checking the operation history information in a case where the shared data is not removed.

FIG. 8 is a screen example in which a list of shared data (shared document data) is displayed. An operation button for checking the operation history is provided for each shared data.

For example, in the screen example of FIG. 8, if the user intends to check an operation history of shared data having a document name of "envelope.txt", the user operates an operation button 80.

Then, for example, a display screen illustrated in FIG. 9 is displayed, and a list of operation history information that are registered for the shared data of "envelope.txt" is displayed.

Through the operation history information illustrated in FIG. 9, it is possible to know that, for example, the user A performs an operation of browsing on the shared data having the document name of "envelope.txt", in the terminal apparatuses 20A having a client address 121.27.195.186 at 19:19 on Aug. 24, 2015.

Figure 10:
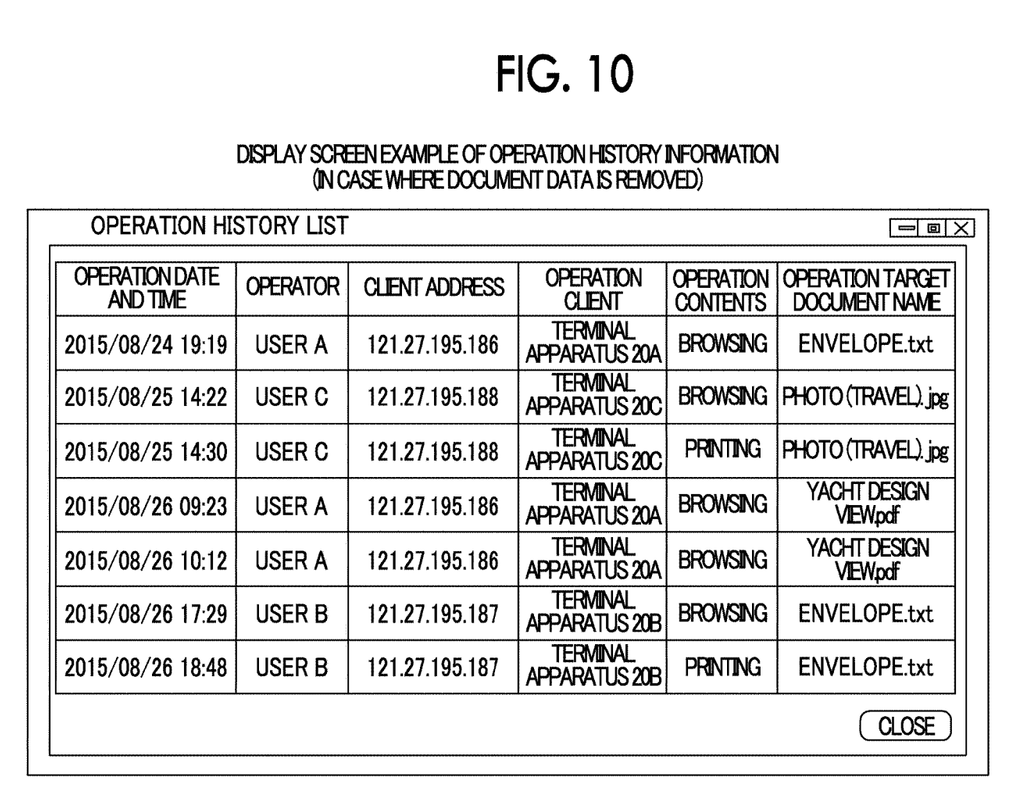
FIG. 10 is a diagram illustrating a management screen example when checking the operation history information, in a case where the shared data are removed.

Next, FIG. 10 illustrates a management screen example for checking the operation history information in a case where the shared data is removed.

The management screen example illustrated in FIG. 10 is a display screen example for checking the list of operation history information with respect to which shared data is removed. Even if the shared data is removed, it is possible to check the operation history information corresponding to the removed shared data through this display screen.

In other words, since the shared data is already removed, it is not possible to associate and manage the operation history information with the shared data. Thus, the operation history information is illustrated on a log basis.

The accumulated operation history information may be transmitted to the server apparatus 10 from the terminal apparatus that performs an operation on copy data in the offline state. Therefore, on the management screen illustrated in FIG. 10, operation history information at an operation time which is earlier than that of the operation history information which is currently stored may be added to the end of the list.

Next, a management screen example for restoring the shared data that is erroneously removed will be described with reference to FIGS. 11 and 12.

Figure 11:
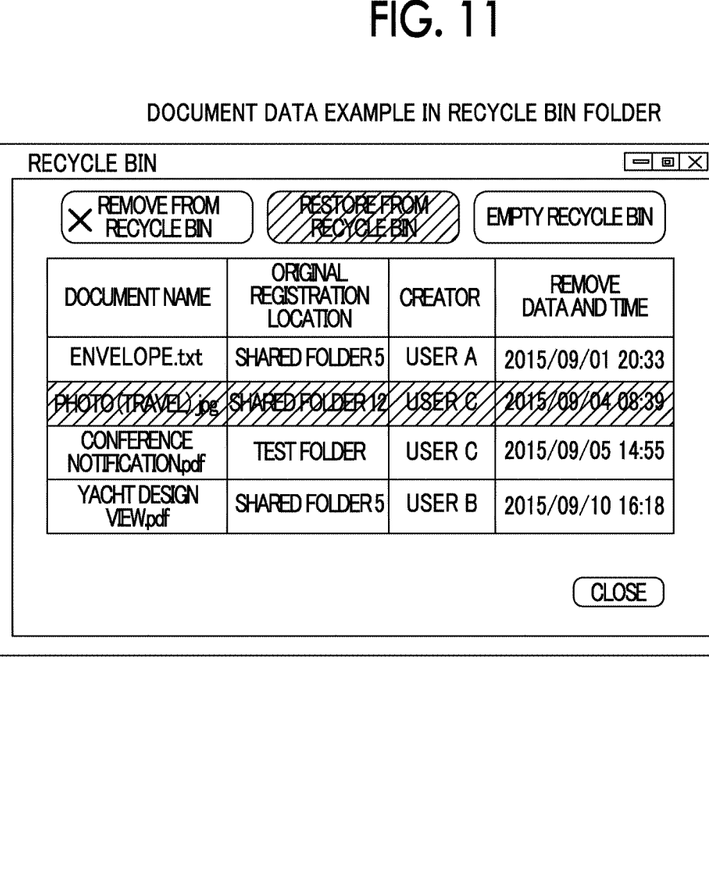
FIG. 11 is a diagram illustrating a screen example illustrating a list of shared data which are once removed and stored in a recycle bin folder.

For example, it is assumed that the screen illustrated in FIG. 11 is displayed as a screen displaying a list of shared data which are once removed and stored in the recycle bin folder.

Here, as illustrated in FIG. 11, it is assumed that shared data having a document name of "photo (travel).jpg" is selected, and that an operation button "restore from the recycle bin" is operated.

Thus, the shared data having the document name of "photo (travel).jpg" is restored from the recycle bin (temporary storing unit 33) to the storing unit 31. Since the shared data having the document name of "photo (travel) .jpg" is restored, in a case where the operation history information illustrated in FIG. 10 is managed, operation history information indicating the operation history for the restored shared data is also registered in the restored shared data.

Figure 12:
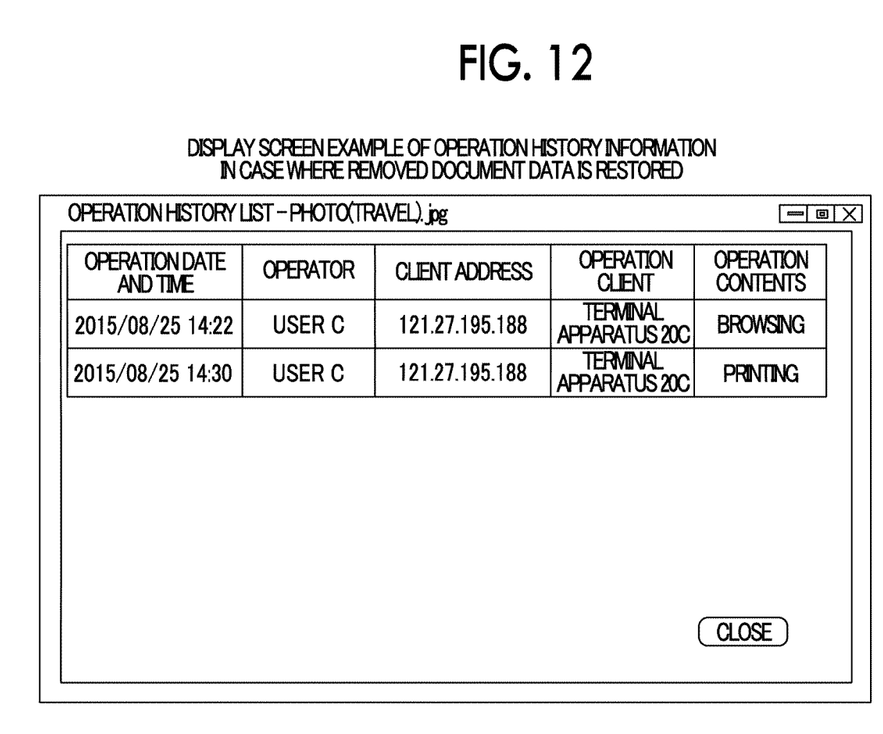
FIG. 12 is a diagram illustrating a screen example when checking the operation history information for restored shared data.

Therefore, if the operation history information of the shared data having the restored document name of "photo (travel).jpg" is checked, it is possible to confirm the operation history information fox the shared data as illustrated in FIG. 12.

Modification Example

In the above exemplary embodiment, the description has been given on the case where the operation history information is information to manage execution of a browsing operation and a printing operation. However, the present invention is not limited thereto. The present invention is similarly applicable to a case where the facts that other operations such as an editing operation, an annotation (annotation information) addition operation, and a decoding operation of encrypted data are performed are managed as history information.

In the exemplary embodiment, the description has been given on the case of using the encryption key information as the specific information for specifying the transmitter of the operation history information. However, the specific information is not limited to the encryption key information, as long as it is capable of specifying the transmitter. For example, it is also possible to use a combination of a user identification number and a password as the specific information.

In the above exemplary embodiment, the program executed by the information processing apparatus may be provided in a state of being stored in a computer-readable recording medium such as a magnetic recording medium (such as a magnetic tape, and a magnetic disk (HDD, flexible disk: FD)), an optical recording media (optical disk (compact disk: CD), and digital versatile disk: DVD)), a magneto-optical recording medium, and a semiconductor memory (flash ROM). These programs may be downloaded through a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A server comprising:
    a first memory that stores shared data accessible by a plurality of persons via a plurality of terminal apparatuses connected to the information processing apparatus over a network, and specific information for specifying the shared data;
    a second memory;
    a third memory that temporarily stores the shared data for which a removal instruction is received by the receiver;
    a receiver that receives the removal instruction to remove the shared data transmitted by one of the plurality of terminal apparatuses;
    a processor configured to, in response to the receiver receiving the removal instruction:
        (1) remove, from the first memory, the shared data corresponding to the removal instruction received by the receiver and move the shared data corresponding to the removal instruction to the third memory, and
        (2) specify a transmitter, from the plurality of terminal apparatuses, of information which is received by the receiving unit, by using the specific information, the information including a history of how the shared data was used at the transmitter, wherein
    after the shared data is removed from the first memory by the processor and the information, received by the receiver, for the removed shared data is specified, the second memory stores the information as information for the removed shared data,
    the processor is further configured to:
        restore the shared data stored in the third memory to the first memory; and
        manage the information for the shared data stored in the first memory together with the shared data, wherein
    when the shared data is restored, the processor acquires, from the second memory, the information from a time at which the shared data is moved to the third memory to a time at which the shared data is restored to the first memory, and manages the acquired information together with the shared data.

2. The server according to claim 1,
    wherein the second memory stores the specific information and the shared data in association with each specific information or each shared data.

3. The server according to claim 1,
    wherein the specific information is key information that is set for encryption of the shared data.

4. The server according to claim 2,
    wherein the specific information is key information that is set for encryption of the shared data.

5. The server according to claim 1,
    wherein where the information is not specified, the processor transmits a notification indicating that the information is fraudulent.

6. The server according to claim 2,
    wherein
        where the information is not specified, the processor transmits notification a indicating that the operation history information is fraudulent.

7. The server according to claim 3,
    wherein
        where the information is not specified, the processor transmits a notification indicating that the information is fraudulent.

8. The server according to claim 4,
    wherein
        where the information is not specified, the processor transmits a notification indicating that the information is fraudulent.

9. The server according to claim 1,
    wherein
        where there is a fraudulent operation in contents of the o information received by the receiver, the processor transmits a notification indicating that there is the fraudulent operation for the shared data.

10. The server according to claim 9,
    wherein where any of an operation time, an operator, operation contents, and an operation location in the contents of the information is fraudulent, the processor transmits the notification indicating that there is the fraudulent operation for the shared data.

11. The server according to claim 9,
    wherein where a pre-authorized operation is not performed or a pre-prohibited operation is performed on the shared data, the processor transmits the notification indicating that there is the fraudulent operation for the shared data.

12. An information processing method comprising:
    receiving a removal instruction to remove shared data stored in a first memory of a server that stores the shared data accessible by a plurality of persons via a plurality of terminal apparatuses connected to the server over a network, and specific information for specifying the shared data transmitted by one of the plurality of terminal apparatuses;

in response to the receiver receiving the removal instruction, (1) removing from the first memory the shared data corresponding to the received removal instruction and moving the shared data corresponding to the removal instruction to a third memory, and (2) specifying a transmitter, from the plurality of terminal apparatuses, of information that is received, by using the specific information, the information including a history of how the shared data was used at the transmitter;

after the shared data is removed from the first memory, the received information for the removed shared data is specified, storing the information as information for the removed shared data in a second memory of the server;

restoring the shared data stored in the third memory to the first memory;

managing the information for the shared data stored in the first memory together with the shared data; and when the shared data is restored to the first memory, acquiring, from the second memory, the information from a time at which the shared data is moved to the third memory to a time at which the shared data is restored to the first memory, and managing the acquired information together with the shared data.

13. A non-transitory computer readable medium storing a program causing a computer to execute information processing, the information processing comprising:

receiving a removal instruction to remove shared data stored in a first memory of a server that stores the shared data accessible by a plurality of persons via a plurality of terminal apparatuses connected to the server over a network, and specific information for specifying the shared data transmitted by one of the plurality of terminal apparatuses;

in response to the receiver receiving the removal instruction, (1) removing from the first memory the shared data corresponding to the received removal instruction and moving the shared data corresponding to the removal instruction to a third memory, and (2) specifying a transmitter, from the plurality of terminal apparatuses, of information that is received, by using the specific information, the information including a history of how the shared data was used at the transmitter;

after the shared data is removed from the first memory, the received information for the removed shared data is specified, storing the information as information for the removed shared data in a second memory of the server;

restoring the shared data stored in the third memory to the first memory;

managing the information for the shared data stored in the first memory together with the shared data; and when the shared data is restored to the first memory, acquiring, from the second memory, the information from a time at which the shared data is moved to the third memory to a time at which the shared data is restored to the first memory, and managing the acquired information together with the shared data.

* * * * *